Patented Oct. 21, 1947

2,429,554

UNITED STATES PATENT OFFICE 2,429,554

HALOGENATED AROMATIC AMINE-ALDEHYDE POLYMER

Samuel S. Kistler, West Boylston, Mass., assignor to Norton Company, Worcester, Mass., a corporation of Massachusetts No Drawing. Original application September 17, 1941, Serial No. 411,249. Divided and this application April 18, 1944, Serial No. 531,650

7 Claims. (Cl. 260—72)

This invention relates to resinous compositions and methods of making the same.

This application is a division of my copending application Serial No. 411,249, filed September 17, 1941, which was a continuation in part of a copending application Serial No. 318,004, filed February 8, 1940, which in turn was a division of my prior application Serial No. 306,545, filed November 28, 1939, and patented February 10, 1942, No. 2,272,873.

One object of the invention is to provide a new type of resin.

Another object of the invention is to provide a resin capable of general use as well as for a bond for the manufacture of grinding wheels and other abrasive bodies.

Another object of the invention is to provide an aniline aldehyde type of resin which has an ingredient capable of causing additional curing thereof when heated.

Another object of the invention is to provide a method of improving an aniline formaldehyde polymer.

Other objects will be in part obvious or in part pointed out hereinafter.

According to this invention, I have provided resinous compositions, and particularly polymeric resinous compositions comprising the reaction product of a halogenated organic compound, such as a halogenated aliphatic hydrocarbon, or of such a halogenated organic compound and an aldehyde, such as formaldehyde or furfural, with the condensation product of an aldehyde and a primary aromatic amine. The halogenated organic compound alkylates the amino nitrogens of the aldehyde-amine condensation product, typically forming an alkylene or substituted alkylene cross-link between nitrogen atoms of adjacent molecules of the condensation product. Halohydric acid from the halogenated compound adds on to at least a portion of the nitrogen atoms to form halohydric salt combinations therewith. When an aldehyde is also reacted with the aldehyde-amine condensation product, further cross-linkages are formed, typically linking aromatic rings of adjacent molecules of the condensation product with methylene or substituted methylene radicals attached to the carbon atom of the aromatic ring adjacent to the amino nitrogen linkage of the condensation product. The reaction products thus obtained are particularly useful as the bond for abrasive articles.

I provide a quantity of a primary aromatic amine, such as aniline, meta phenylene diamine, meta toluidine, or diamino diphenyl methane; a quantity of an aldehyde, such as formaldehyde or furfural; and an organic compound containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. According to the invention, aniline

or other primary aromatic amine is reacted with formaldehyde, HCHO, or with furfural

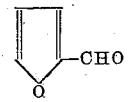

in the presence of a strong acid to produce a long chain polymer which, when an excess of formaldehyde or furfural above the stoichiometric proportions is used, for example 20% excess, has adjacent chains connected with methylene, —CH$_2$—, or substituted methylene

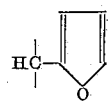

groups to form a tough, heat resistant, semi-thermoplastic resin. I may add some of the aldehyde after the initial condensation, and my invention clearly contemplates that one aldehyde may be used at one stage, and a different aldehyde may be used at another stage.

As examples of the halogenated organic compound, I may use an organic aliphatic chlorinated polymer selected from the group of any chlorine, bromine or iodine substituted paraffine hydrocarbon, such as hexa chloro ethane, tetra chloro pentane, 1, 2, diiodo ethane, beta butylene bromide and partly chlorinated eicosane. Most of the examples are chlorinated compounds because these are cheaper and more readily available than the brominated or iodated compounds, but the latter two give effective results. The fluorinated compounds are rejected because they are too stable and will not alkylate the polymer nor provide hydrogen halide for reaction at the grinding line of a grinding wheel.

I believe that the novel resin of the invention has utility for many purposes, such as for the manufacture of many types of molded articles, and especially for use as the binder for sandpaper or abrasive cloth, and for abrasive discs, and for the adhesive for abrasive coated polishing wheels such as are referred to as "set-up wheels." However, the principal use of the resin of my invention is for the bond of grinding wheels, and other solid abrasive articles, such as segments, sectors, honing sticks and the like. Accordingly, whereas it should be understood that the resin may be formed without abrasive filler, or with any other filler, such as sawdust, graphite, carbon, asbestos, cloth or quartz, in the examples I shall describe the manufacture of grinding wheels. The technique for manufacturing other solid abrasives is substantially the same.

I, therefore, provide a quantity of abrasive grain. Any abrasive grain may be used, for example, any of the varieties of alumina, such as emery, corundum, dense "regular" fused alumina, porous fused alumina, silicon carbide, and other hard carbides, quartz, glass, garnet or diamonds. Considering now specific examples of the manufacture of grinding wheels in accordance with the present invention, I may proceed as follows:

*Example I*

Eight hundred and fifty-eight cubic centimeters of aniline is dissolved in eight liters of water containing nine and three tenths mols of phosphoric acid. To this is added eight hundred and fifty cubic centimeters of formalin solution containing four tenths gram of formaldehyde per cubic centimeter. After standing for one hour, a quantity of sodium hydroxide is added equivalent to the hydrochloric acid present. The precipitated resin is filtered, washed, dried and ground to a fine powder. Into each ten pounds of this powdered resin I mix two and two tenths pounds of tetra chloropentane. This substituted paraffin appears to give somewhat better results than the others. However, in the usual case the compound may not have an exact formula. It may be a mixture of, for example, tri-chloropentane, tetra-chloropentane and hepta-chloropentane, averaging perhaps tetrachloropentane. Similarly, instead of using the choloropentanes, I may use hexa-chloroethane, or I may use tetra-chloroethane and tri-chloroethane and mixtures of these and compounds averaging such formulae. As stated, I could also substitute ethylene iodide or beta butylene bromide or other similar compounds. The invention involves the use of a paraffine hydrocarbon, for some of the hydrogen atoms of which is substituted chlorine and/or bromine and/or iodine and both straight chain and branch chain paraffine derivatives are included. These compounds may be fully halogenated or they may be only partly halogenated. I find that 20% halogen is sufficient to give practical results.

Twenty-eight and one-tenth pounds of a porous relatively pure grade of fused alumina abrasive, No. 20 grit size, is now wet with twenty-three hundredths of a pound of furfural. Five and nine-tenths pounds of the above mixture of aniline formaldehyde resin and the halogenated paraffine are intimately mixed with the fused alumina wet with furfural, spread in an eighteen inch mold with a five inch arbor, and hot pressed for one hour and a half at a temperature of 160° C. under a pressure of three tons per square inch. The wheel is then stripped from the mold.

As conducive to a clearer understanding of the present invention, I believe that a typical structural formula of the resin thus produced by the use of hexachloroethane is as follows:

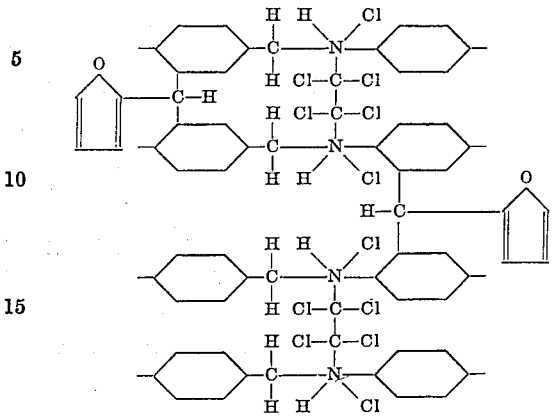

The above is the modified polymer formed when hexa-chloroethane is used. It is believed that the nitrogen atoms of the amine groups are connected by the hexa chloroethane. Hydrogen chloride is found attached to each nitrogen atom. However, because of lack of sufficient bonds, Nos. 1 and 2 nitrogen atoms may be connected and Nos. 3 and 4 nitrogen atoms may be connected, but Nos. 2 and 3 in such case will not be connected.

It is thought that alkylation is represented by the connection of nitrogen atoms 1 to 2, 3 to 4, 5 to 6, 7 to 8 et cetera in a long chain series but not 2 to 3, 4 to 5, or 6 to 7. However, if less than the stoichiometric proportion of the paraffine compound is used (based on the above formula), fewer pairs of nitrogen atoms will be connected by the halogenated paraffine hydrocarbon. The compound represented and others like it have the property of giving off hydrogen chloride when heated to a temperature of the order of 500° C. When cooled down far below that point, they no longer give up hydrogen chloride.

It will be observed from the structural formula that occasional pairs of benzene rings may be connected with a furyl methylene group. This is derived from furfural which is the aldehyde of furfurane and, furthermore, it is derived from the furfural which is used to wet the abrasive grains. When furfural is substituted in whole or in part for formaldehyde for the original condensation process, a furyl group will be found replacing one hydrogen atom attached to the carbon of some of the methylene groups connecting the amino groups to the opposite ring. For example, the following represents a short section of the polymeric structure when furfural instead of formaldehyde is used in the original condensation:

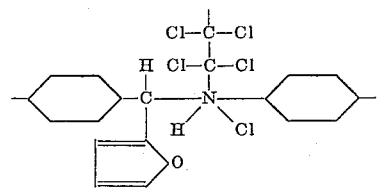

It will be seen that it is more advantageous to plasticize the abrasive grains with furfural because thereby a number of additional linkages are provided in the polymeric structure, making it stronger.

*Example II*

Thirty-seven pounds of 14 mesh fused alumina abrasive is placed in a mixing pan and wet with five hundred and forty cubic centimeters of furfural. To this are added nine pounds of the mixture of resin and halogenated paraffin of Example I and two pounds of cryolite. Mixing is continued and the mixture thus produced (substantially a dry granular mix) is spread in a sixteen inch mold with a six inch arbor and hot pressed for two hours at a temperature of 160° C. and under a pressure of five hundred tons. Such a wheel will give as good a finish on stainless steel as a rubber wheel but is much more durable.

It may be noted at this point that cold pressing can be resorted to by reason of the plasticizing of the abrasive grains with furfural. However, the results are not as satisfactory as when the hot pressing method is used. Furthermore, the addition of furfural definitely increases the plasticity and provides a better product when hot pressing.

*Example III*

Eight hundred and fifty-eight cubic centimeters of aniline were dissolved in eight liters of water containing nine and three-tenths mols of hydrochloric acid. To this was added seven hundred and fifty cubic centimeters of formalin solution containing four-tenths grams of formaldehyde per cubic centimeter. After standing for one hour, a quantity of sodium hydroxide was added equivalent to the hydrochloric acid present. The precipitated resin was filtered, washed, dried and ground to a fine powder. Eight hundred and eighty-five grams of 60 mesh fused alumina is mixed dry with one hundred and sixty grams of the powdered resin and forty-nine grams of chlorinated eicosane. This mixture is spread in an eight inch mold and pressed at a temperature of 175° C. under a pressure of one hundred and fifty tons for half an hour. This constitutes a grinding wheel the resin bond of which is hard, tough and heat resistant. This bond likewise during grinding liberates hydrogen chloride at the grinding line.

A fully chlorinated eicosane could be produced but is not readily available. Partially chlorinated eicosane is quite satisfactory for the purpose. Furthermore, the name eicosane has been chosen as the proper chemical name for the product with twenty carbon atoms but the usual commercial variety which can be obtained under the title "Chlorcosane" contains twenty carbon atoms more or less and is probably a mixture of chlorinated high molecular weight paraffines averaging twenty carbon atoms and containing perhaps some molecules with eighteen and some with twenty-two carbon atoms etc. It is thought that the chlorine and hydrogen are found more or less at random in the molecule and that there is no particular order of these atoms. The chlorine atoms can and do attach themselves to other chains of the resin and form further linkages in a three-dimensional structure.

It is not only the hydrogen chloride directly attached to the nitrogen that is available as acid at the grinding line. At the grinding temperature the entire resin decomposes, liberating hydrogen chloride. Such decomposition of the resin clears the abrasive grains for further grinding. Of course, the abrasive itself gradually wears down and this resin will not go to pieces any faster than phenol formaldehyde, for example. According to this invention, such bond contains a considerable quantity of halogen and advantage is taken of the dissociation which inevitably releases hydrogen halide which materially assists the abrasive action in clearing the chips of metal and probably also facilitates the actual cutting.

*Example IV*

Ten hundred and eighty grams of metaphenylene diamine is dissolved in eight liters of water containing twenty mols of hydrochloric acid. To this solution is added seven hundred and fifty cubic centimeters of formalin solution containing four tenths gram formaldehyde per cubic centimeter. After standing one hour a quantity of sodium hydroxide is added equivalent to the hydrochloric acid. The precipitated resin is filtered, washed, dried, and ground to a fine powder. Eight hundred and eighty-five grams of 60 mesh fused alumina is mixed dry with one hundred and sixty grams of the above powdered resin and forty-nine grams of beta butylene bromide,

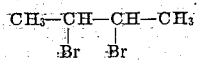

This mixture is spread in an eight inch mold and pressed at a temperature of 175° C. under a pressure of one hundred and fifty tons for half an hour. This wheel has characteristics similar to the wheels of the other examples.

The following is the structural formula of meta phenylene diamine:

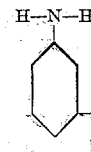

The structure of the brominated resin may be as follows:

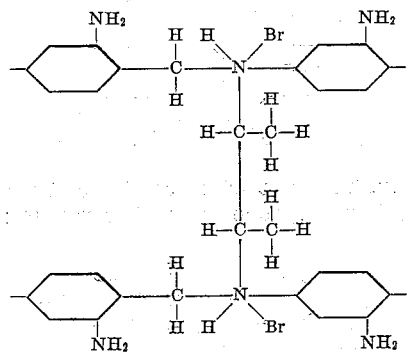

Hydrobromic acid is liberated at the grinding line.

*Example V*

Nine hundred and thirty grams of aniline and two liters of water containing eleven mols of hydrochloric acid are mixed with six hundred and seventy cubic centimeters of furfural and heated to 80° C. overnight. The solid mix resulting is ground and suspended in water containing sodium hydroxide equivalent to the hydrochloric acid used. After neutralization is complete, the powder is filtered, washed and dried.

Eight hundred and eighty-five grams of 60 mesh fused alumina is first wet with thirty cubic centimeters of furfural. Then one hundred and sixty grams of the above powdered resin and twenty grams of ethylene iodide are added. This mixture is spread in an eight inch mold and pressed under a pressure of two hundred tons. It is then stripped from the mold and the "green" wheel is baked in an autoclave under a pressure of seven atmospheres at a temperature gradually rising to 175° C. and maintained at this temperature for three hours. The structure of the resin may be represented as follows:

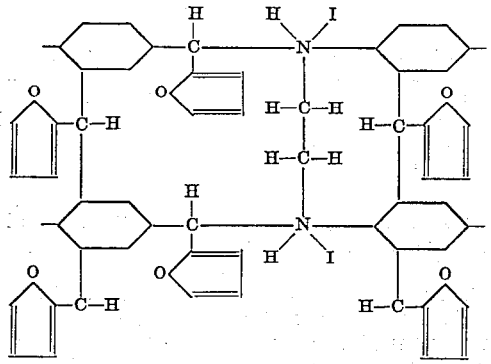

For the acid used in condensing the resin, besides hydrochloric and phosphoric acids, any of the following acids or many others may also be used:

Hydriodic acid
Trichloro acetic acid
Di-chloro acetic acid
Maleic acid
Oxalic acid
Sulphuric acid The requirement is that the acid should be at least as strong as phosphoric acid to give the best results.

Considering now the various features of this invention, when aniline is condensed with formaldehyde in the presence of a strong acid, we may have the following resin structure:

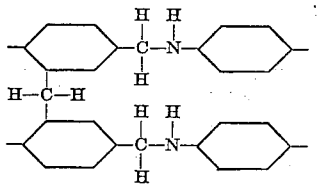

When furfural is used to condense the aniline, we may have the following resin structure:

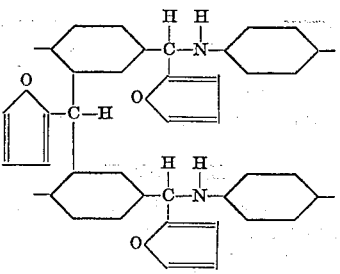

In each of the above cases the use of enough aldehyde to cross link has been assumed. Similar structural formulae may be written for meta toluidine, meta phenylene diamine and diamino diphenyl methane.

The above specified halogenated organic compounds which serve the purposes of my invention are halogen bearing, aliphatic alkylating compounds, and the reactive groups alkylate and cross link the adjacent resin chains. The reaction of the halogenated organic compound with the condensation product appears to cross link and alkylate the condensation product at the amino groups and it is believed that typical resinous products of the invention may be represented by the following general structural formula which is repeated in a complex chain:

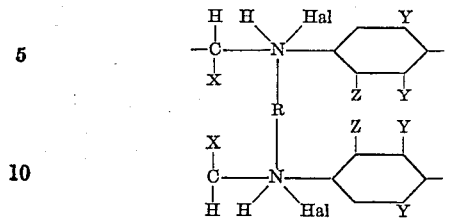

wherein X is selected from the group consisting of H and

Y is selected from the group consisting of H, $NH_2$ and $CH_3$, Hal is selected from the group consisting of Cl, Br, and I, R is a bivalent radical selected from the group consisting of alkylene radicals and halogenated alkylene radicals, and the adjacent Z's may be hydrogen or a methylene or furyl bridge between adjacent benzene rings.

While I have mentioned specific curing temperatures, it should be understood that the upper limit is determined only by the decomposition point of the resin. Temperatures short of 190° C. are safe. At the lower end, almost any temperature can be used but preferably above 60° C. but the lower the temperature, the more time to carry the reaction to completion. Practical results can be obtained with temperatures above 90° C.

The percentage of the ethylene iodide to the reactants including the ethylene iodide in Example V is 9.31%. The percentage of the chlorinated eicosane to the reactants including the chlorinated eicosane in Example III is 23.44%. The percentage in Example V is the lowest percentage of all of the examples and the percentage in Example III is the highest percentage of all the examples, so therefore the range about 9.31% to about 23.44% is used in the claims.

It will thus be seen that there has been provided by this invention a composition of matter, an article of manufacture, and an art in which the various objects hereinabove set forth together with many thoroughly practical advantages are successfully achieved. As various possible embodiments might be made of the features of the above invention and as the art herein described might be varied in various parts, all without departing from the scope of the invention, it is to be understood that all matter hereinbefore set forth is to be interpreted as illustrative and not in a limiting sense.

I claim:

1. A halogenated cross linked aromatic amine polymer comprising a condensation product of one molecular proportion of primary aromatic amine selected from the group consisting of aniline, meta-phenylene diamine, meta-toluidine and diamino-diphenylmethane, and at least one molecular proportion of aldehyde selected from the group consisting of formaldehyde and furfural, condensed in the presence of at least one molecular proportion of acid at least as strong as phosphoric acid and reacted by heating at resin curing temperatures with from 9.31% to 23.44% on the weight of the reactants of a halogenated paraffin hydrocarbon containing from 2 to 20 carbon atoms and at least 2 atoms of a halogen selected from the group consisting of chlorine, bromine and iodine.

2. A halogenated cross linked aromatic amine polymer comprising a condensation product of one molecular proportion of aniline and at least one molecular proportion of aldehyde selected from the group consisting of formaldehyde and furfural, condensed in the presence of at least one molecular proportion of acid at least as strong as phosphoric acid and reacted by heating at resin curing temperatures with from 9.31% to about 23.44% on the weight of the reactants of a halogenated paraffin hydrocarbon containing from 2 to 20 carbon atoms and at least 2 atoms of a halogen selected from the group consisting of chlorine, bromine and iodine.

3. A halogenated cross linked aromatic amine polymer comprising a condensation product of one molecular proportion of primary aromatic amine selected from the group consisting of aniline, meta-phenylene diamine, meta-toluidine and diamino-diphenylmethane, and at least one molecular proportion of formaldehyde, condensed in the presence of at least on molecular proportion of acid at least as strong as phosphoric acid and reacted by heating at resin curing temperatures with from 9.31% to 23.44% on the weight of the reactants of a halogenated paraffin hydrocarbon containing from 2 to 20 carbon atoms and at least 2 atoms of a halogen selected from the group consisting of chlorine, bromine and iodine.

4. A halogenated cross linked aromatic amine polymer comprising a condensation product of one molecular proportion of aniline and at least one molecular proportion of aldehyde consisting at least in part of formaldehyde, condensed in the presence of at least one molecular proportion of acid at least as strong as phosphoric acid, and reacted by heating at resin curing temperatures with from 9.31% to 23.44% on the weight of the reactants of a halogenated paraffin hydrocarbon containing from 2 to 20 carbon atoms and at least 2 atoms of a halogen selected from the group consisting of chlorine, bromine and iodine.

5. A halogenated cross linked aromatic amine polymer according to claim 1 in which the halogenated paraffin hydrocarbon is hexa chloroethane.

6. A halogenated cross linked aromatic amine polymer according to claim 1 in which the halogenated paraffin hydrocarbon is tetra chloropentane.

7. A halogenated cross linked aromatic amine polymer according to claim 1 in which the halogenated paraffin hydrocarbon is chlorinated eicosane.

SAMUEL S. KISTLER.

REFERENCES CITED

The following references are of record in the file of this patent:

UNITED STATES PATENTS

| Number | Name | Date |
|---|---|---|
| 1,969,744 | Gams | Aug. 14, 1934 |
| 1,999,093 | Gams | Apr. 23, 1935 |
| 2,038,142 | Sutter | Apr. 21, 1936 |

FOREIGN PATENTS

| Number | Country | Date |
|---|---|---|
| 598,943 | Germany | June 21, 1934 |